United States Patent [19]

Gusavage et al.

[11] Patent Number: 5,330,596
[45] Date of Patent: * Jul. 19, 1994

[54] RECYCLING OF BARRIER POLYSTYRENE FOAM SCRAP AND BARRIER POLYSTYRENE FOAM CONTAINING RECYCLED BARRIER POLYSTYRENE FOAM SCRAP

[76] Inventors: Gerald G. Gusavage, 420 Trena Ave., Lancaster, Pa. 17601; Thomas A. Hessen, 641 Ridgeview Dr., Eprata, Pa. 17522; Thomas R. Hardy, 1018 N. 12th St., Lebanon, Pa. 17042; Henry G. Schirmer, 156 Edgecombe Rd.; Susan R. Flye, 807 Palmetto St., both of Spartanburg, S.C. 29302

[*] Notice: The portion of the term of this patent subsequent to Jun. 2, 2009 has been disclaimed.

[21] Appl. No.: 882,216

[22] Filed: May 13, 1992

Related U.S. Application Data

[63] Continuation-in-part of Ser. No. 590,892, Oct. 1, 1990, Pat. No. 5,118,561.

[51] Int. Cl.$^5$ .............................................. B32B 3/26
[52] U.S. Cl. ...................................... 156/78; 156/94; 521/40; 521/40.5
[58] Field of Search ......................... 428/304.4, 319.7; 156/78, 94; 521/40, 40.5

[56] References Cited

U.S. PATENT DOCUMENTS 5,118,561 6/1992 Gusavage et al. ............... 428/304.4

Primary Examiner—George F. Lesmes
Assistant Examiner—Christopher Brown

[57] ABSTRACT

A barrier foam tray contains recycled reclaim of barrier foam. The tray comprises a sheet of foamed polystyrene (PS) having laminated to it a flexible barrier film. The foamed polystyrene part can have admixed therein from 0.0001% up to 30% by weight of the flexible barrier film. The barrier film contains a barrier polymer such as ethylene vinyl alcohol copolymer (EVOH). The tray is made by grinding laminate scrap and extruding reclaim therefrom with virgin polystyrene.

3 Claims, 1 Drawing Sheet

RECYCLING OF BARRIER POLYSTYRENE FOAM SCRAP AND BARRIER POLYSTYRENE FOAM CONTAINING RECYCLED BARRIER POLYSTYRENE FOAM SCRAP

REFERENCE TO COPENDING APPLICATION

This application is a continuation-in-part of U.S. application Ser. No. 590,892 filed Oct. 1, 1990, now U.S. Pat. No. 5,118,561.

FIELD OF THE INVENTION

In general the invention relates to polystyrene foam sheet and trays made therefrom having adhered thereto a flexible film of an oxygen barrier material such as ethylene vinyl alcohol copolymer film. More particularly, the invention relates to the recycling of scrap barrier foam from such barrier foam trays.

BACKGROUND OF THE INVENTION

The manufacture of polystyrene (PS) foam rigid packaging trays (absent a barrier layer) is well known. Such trays are used in grocery stores to protect and display fresh meat, poultry, cooked meat, and produce. The trays are commonly made by thermoforming polystyrene foam sheet.

Polystyrene trays are manufactured in a two-stage process covering (1) extrusion and (2) thermoforming. For the extrusion, pelletized polystyrene resin, "optional" scrap, citric acid and sodium bicarbonate are fed into an extruder at around 400° F., melted, and mixed. Then, the hot mixture is blown with a hydrocarbon such as pentane and/or $CO_2$ gas to foam the material. The tubular foamed PS sheet expands as it exits the extruder. The tube is slit into sheets, wound into rolls and taken to an outside storage yard to cure for about 3 days. This curing allows residual pentane to escape and is not required when 100% of $CO_2$ is used to foam the material. Curing time is reduced when a hydrocarbon/$CO_2$ blend is employed.

For the thermoforming, the roll of cured polystyrene foam sheet is fed through an oven to heat it near to its softening point. The hot sheet is then forced into tray molds by vacuum, air, and mechanical pressure. The molded foam sheet is then fed through a trim press where a punch and die mechanism cuts the individual rigid trays from the sheet. The trays are packaged in polyethylene bags and stored in plant warehouse space prior to shipment to customers.

Polystyrene foam material scrap is generated in both the extrusion and thermoforming operations. Extrusion scrap is mainly in foam sheet form and results from machine start-ups, and size and color changes. Thermoforming scrap is primarily trim scrap, the skeleton remaining after the trays are cut from the foam sheet, and trays rejected for quality control criteria. Reprocessing of scrap material is accomplished by first grinding the scrap into a "fluff" form and then extruding the fluff into pellet form, which is then usable as the "optional" scrap in the foam sheet extrusion process.

Furthermore, marketing and distribution practices in the sale of food increasingly require that the packaging materials provide better shelf life. Thus packaging materials with lower oxygen transmission rates are more and more desirable, particularly for oxygen-sensitive products such as fresh red meats or cooked meats.

Accordingly, packaging material with a low oxygen transmission rate has been provided by adhering a flexible barrier film to the extruded polystyrene foam sheet prior to thermoforming into trays so that the trays are barrier foam trays.

Foam trays having a flexible polymeric film sheet adhered thereto, are known from U.S. Pat. No. 4,847,148 (Jul. 11, 1989) to Schirmer; U.S. Pat. No. 3,748,218 (Jul. 24, 1973) to Newman et al; U.S. Pat. No. 4,832,775 (May 23, 1989) to Park et al; U.S. Pat. No. 3,793,135 (Feb. 19, 1974) to Monia; U.S. Pat. No. 4,055,672 (Oct. 25, 1977) to Hirsch et al; U.S. Pat. No. 4,076,570 (Feb. 28, 1978) to Medley et al; U.S. Pat. No. 4,111,349 (Sep. 5, 1978) to Buckler et al; U.S. Pat. No. 4,332,858 (Jun. 1, 1982) to Saitoh et al; U.S. Pat. No. 4,558,099 (May 13, 1986) to Diez; and U.S. Pat. No. 4,659,785 (Apr. 21, 1987) to Nagano et al. The disclosures of these references are incorporated herein by reference. It is also noted that various devices are known to enhance the microwavability of such trays for use in microwave heating of foods in microwave ovens, such as adding particulate polyphenylene oxide to the foaming polystyrene or perforating the polystyrene sheet. Typically in the past saran, also known as vinylidene chloride copolymer, was used for the flexible film for an oxygen barrier layer on such foam trays.

However, a problem arose in what to do with the barrier foam scrap, particularly the thermoforming trim scrap, i.e. the skeleton remaining after the trays are cut, when the flexible barrier film had saran in it. When saran-containing barrier foam scrap was ground into fluff, the fluff pelletized, and the pellets placed in the extruder with the virgin polystyrene pellets, citric acid and the sodium bicarbonate, it was found that barrier scrap burned in the extruder and so could not be used.

In today's world, the emphasis is great on recycling. However, the saran-containing scrap was unusable and had to be discarded when trays were cut. Skeleton scrap, i.e. the thermoforming trim, is typically 24 to 25% by weight, but can be as much as 30% by weight or more of the sheet when trays are cut. Thus, from an environmental/pollution standpoint, it is desirable that the scrap, particularly thermoforming trim, be reclaimed and recycled, not discarded.

OBJECT OF THE INVENTION

With the present invention, it has been unexpectedly discovered that barrier foam scrap can be reclaimed and the reclaim recycled. From as little as about 0.001% up to about 50% by weight of the pellet resin feed going into the extruder may be reclaim comprising barrier foam scrap that has been ground and pelletized for most applications. For at least some shallow draw applications such as relatively shallow trays, up to 100% reclaim may be employed. Obviously, at high reclaim levels, such would be reclaimed from an earlier run.

The term "reclaim" means ground and pelletized scrap from a laminate of foamed polymer and flexible barrier film, where the flexible barrier film comprises a barrier polymer other than saran.

SUMMARY OF THE INVENTION

Therefore, the present invention provides a thermoformable barrier sheet comprising a laminate of (a) a flexible barrier film having (i) an oxygen barrier layer free of vinylidene chloride copolymer, and (ii) a bonding layer capable of adhesion to a foamed polymer sheet when said bonding layer is exposed to corona discharge or heat and pressure; and (b) a layer of foamed polymer sheet having two opposing surfaces, wherein the bonding layer is adhered to at least one said surface of said foamed polymer sheet, and said foamed polymer sheet contains from about 0.001% up to about 100% by weight reclaim. The reclaim contains ground and pelletized scrap laminate of foamed polymer sheet and flexible barrier film, whereby said foamed polymer sheet contains on a weight basis from about 0.0001% up to about 30% flexible barrier film. Preferably, the oxygen barrier layer comprises a barrier polymer that is selected from ethylene vinyl alcohol copolymer, acrylonitrile copolymer, amorphous nylon, copolymer, or mixtures thereof. Also, the thermoformed barrier sheet may have disposed between flexible film (a) and foamed polymer sheet (b), layer (c) of flexible reclaim film.

Also the present invention provides a method to recycle thermoformable barrier sheet comprising (a) extruding and foaming polymer pellets thereby making a first sheet of foamed polymer having two opposing surfaces; (b) laminating onto at least one said surface of said first foamed sheet a flexible barrier film, said flexible barrier film having a barrier layer containing a barrier polymer selected from ethylene vinyl alcohol copolymer, acrylonitrile copolymer, amorphous nylon copolymer, or mixtures thereof, and a bonding layer, whereby the bonding layer is adhered to the one said surface of said foamed polymer sheet thereby making a laminate; (c) thermoforming the resultant laminate, where steps (b) and (c) generate scrap of laminate; (d) making reclaim pellets by grinding and pelletizing the scrap; (e) extruding and foaming more of said polymer pellets together with up to 100% by weight of the reclaim pellets of scrap, thereby making a second sheet of foamed polymer having two opposing surfaces; and (f) laminating onto at least one said surface of said second foamed sheet a flexible barrier film; whereby said second foamed sheet contains on a weight basis up to 30% flexible barrier film.

Also, the present invention provides a method to recycle thermoformable barrier sheet comprising: (a) extruding and foaming polymer pellets thereby making a first sheet of foamed polymer having two opposing surfaces; (b) laminating onto at least one said surface of said first foamed sheet a flexible barrier film, said flexible barrier film having a barrier layer containing a barrier polymer selected from ethylene vinyl alcohol copolymer, acrylonitrile copolymer, amorphous nylon copolymer, or mixtures thereof and a bonding layer, whereby the bonding layer is adhered to the one said surface of said foamed polymer sheet thereby making a laminate; (c) thermoforming the resultant laminate, where steps (b) and (c) generate scrap of laminate; (d) making reclaim pellets by grinding and pelletizing the scrap; (e) extruding the reclaim into flexible reclaim film; (f) extruding and foaming more of said polymer pellets thereby making a second sheet of foamed polymer having two opposing surfaces; (g) laminating onto at least one said surface of said second foamed sheet a flexible reclaim film; and (h) laminating onto the reclaim film a flexible barrier film.

Also, the present invention provides a thermoformed barrier tray comprising:
(a) a flexible barrier film having (i) a barrier layer free of vinylidene chloride copolymer and (ii) a bonding layer capable of adhesion to a foamed polymer sheet when said bonding layer is exposed to corona discharge or heat and pressure; and (b) a layer of foamed polymer sheet having two opposing surfaces, wherein the bonding layer is adhered to at least one said surface of said foamed polymer sheet, and said foamed polymer sheet contains from about 0.001% up to about 100% by weight reclaim.

Also, the thermoformed barrier tray may have flexible reclaim film (c) disposed between flexible barrier film (a) and foamed polymer sheet (b).

DETAILED DESCRIPTION

Figure 1:
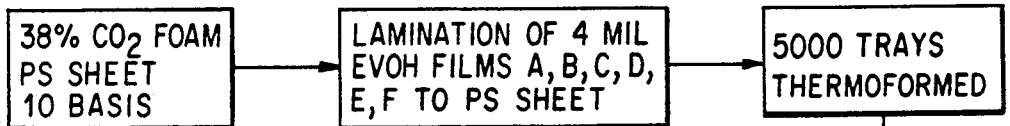
FIG. 1 is a Flow Chart graphically illustrating the making of barrier foam trays as described in Example II.
Figure 1:
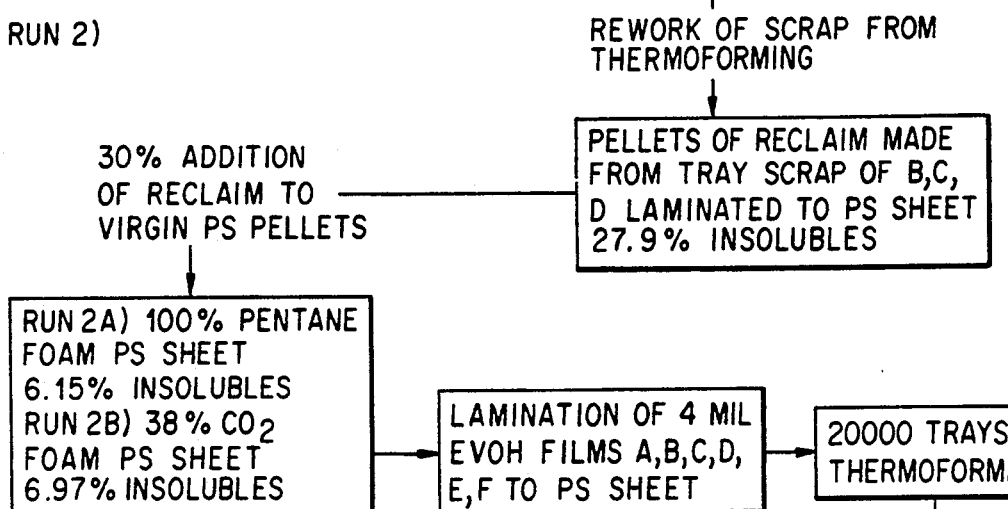
Figure 1:
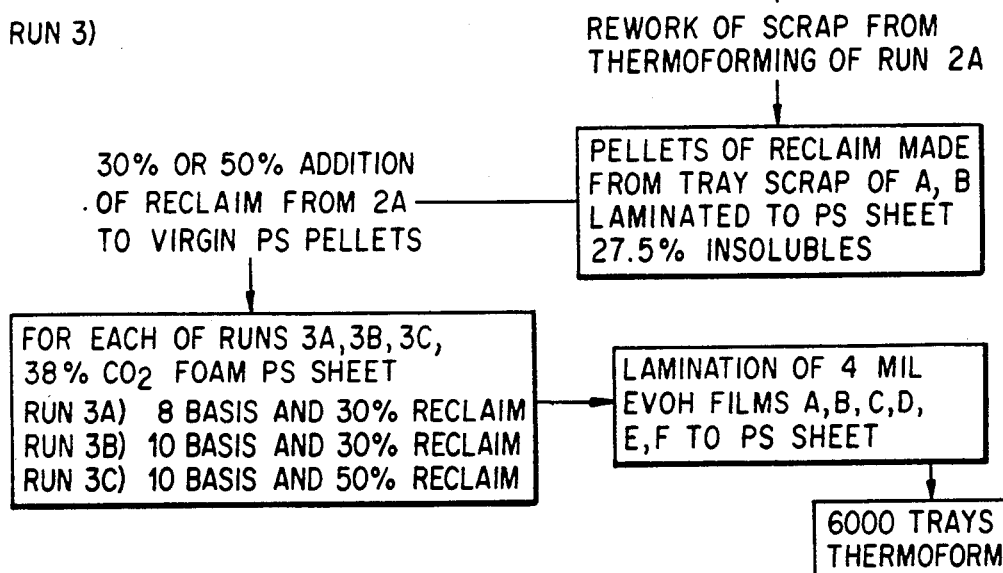

The foamed polymer may be selected from polystyrene, foams, epoxy foams, phenolic foams, syntactic foams, urethane foams, or blends thereof.

The flexible barrier film sheet comprises a barrier polymer with a low gas transmission other than saran, i.e. vinylidene chloride copolymer. The gas of main concern is oxygen and transmission is considered to be sufficiently low, i.e. the barrier material is relatively gas impermeable, when the transmission rate is below 70 $cc/m^2/mil$ thickness/24 hours/atmosphere, as measured according to the procedure of ASTM Method D-3985. The barrier layer of the present invention has a transmission rate below this value. A preferred rate is less than 50 cc. In the present invention, typical suitable barrier polymers other than saran that are a good oxygen barrier, i.e. have low oxygen transmission rates, which polymers may be employed for the barrier layer of the flexible barrier film are ethylene vinyl alcohol (hereinafter EVOH), acrylonitrile copolymers and nylon copolymers.

"Insolubles" tests, as reported in the Examples below were performed by placing ground up barrier foam material in methylene chloride solvent. Only PS is soluble in this solvent. Thus the remaining "insolubles" by weight indicated the amount of flexible barrier film.

In general, the recycling method of the instant invention is as follows. Polymer pellets are extruded and foamed to make a foamed polymer sheet. Then a flexible barrier film is laminated to the foamed polymer sheet. The flexible barrier film comprises a barrier polymer other than saran. The resultant is thermoformed into trays and the like with the skeleton scrap being trimmed from the edges. The skeleton scrap, and optionally other barrier foam scrap, is then ground and pelletized, creating reclaim pellets. These reclaim pellets are then placed in the hopper with virgin polymer pellets such as virgin polystyrene, and extruded and foamed into a second foamed sheet. Then a flexible barrier film is laminated onto the second foamed sheet. Then this second foamed sheet is thermoformed into trays, leaving skeleton scrap. Again, this skeleton scrap, and optionally other barrier foam scrap, is ground and pelletized for placement in the hopper. This process can be repeated and repeated for 10 cycles, 20 cycles or even more. Alternatively, at any point some reclaim can be used by extruding it into a flexible film and laminating that between a foamed sheet and a flexible barrier film.

MATERIALS EMPLOYED IN THE EXAMPLES:

| GENERIC NAME AND TRADENAME | COMMENTS | SUPPLIER |
|---|---|---|
| EVOH | | |
| Soarnol DT | 29 mol % ethylene | Nippon Gohsei |
| Soarnol ET | 38 mol % ethylene | Nippon Gohsei |
| Soarnol AT | 44 mol % ethylene | Nippon Gohsei |
| EVA | | |
| Elvax 3130 | 12% VA MI = 2.5 | DuPont |
| Elvax 3175 | 28% VA MI = 6 | DuPont |
| Elvax 3180 | 28% VA MI = 25 | DuPont |
| Elvax 3182 | 28% VA MI = 3 | DuPont |
| LLDPE | | |
| Dowlex 2035 | density = 0.920 comonomer = octene | Dow |
| ADHESIVE | | |
| Bynel 3062 | polyethylene copolymer | DuPont |

The following Examples are intended to illustrate the invention and it is not intended to limit the invention thereby.

EXAMPLE I

Mfr of films to be laminated to foam

Unoriented, flexible barrier films having a core layer of EVOH were made by water cast coextruding. The films were 4 mils (about 101 microns) thick and 22 inches (about 56 cm) wide and had the following multi-layer structure.

| Film A: | | | | | | | |
|---|---|---|---|---|---|---|---|
| EVA (28% VA) (MI = 3) | / | EVA (12% VA) (MI = 2.5) | / Adh / | EVOH (29 mol % ethylene) | / Adh / | EVA (12% VA) (MI = 2.5) | / LLDPE |
| Film B: | | | | | | | |
| EVA (28% VA) (MI = 3) | / | EVA (12% VA) (MI = 2.5) | / Adh / | EVOH (29 mol % ethylene) | / Adh / | EVA (12% VA) (MI = 2.5) | / LLDPE |
| Film C: | | | | | | | |
| EVA (28% VA) (MI = 6) | / | EVA (12% VA) (MI = 2.5) | / Adh / | EVOH (29 mol % ethylene) | / Adh / | EVA (12% VA) (MI = 2.5) | / LLDPE |
| Film D: | | | | | | | |
| EVA (28% VA) (MI = 25) | / | EVA (12% VA) (MI = 2.5) | / Adh / | EVOH (29 mol % ethylene) | / Adh / | EVA (12% VA) (MI = 2.5) | / LLDPE |
| Film E: | | | | | | | |
| EVA (28% VA) (MI = 3) | / | EVA (12% VA) (MI = 2.5) | / Adh / | EVOH (38 mol % ethylene) | / Adh / | EVA (12% VA) (MI = 2.5) | / LLDPE |
| Film F: | | | | | | | |
| EVA (28% VA) (MI = 3) | / | EVA (12% VA) (MI = 2.5) | / Adh / | EVOH (44 mol % ethylene) | / Adh / | EVA (12% VA) (MI = 2.5) | / LLDPE |

*Surface EVA layer in film B was 0.95 mil and thus was thicker than 0.5 mil surface EVA layer in film A. Otherwise Films A and B were same.

EXAMPLE II

Run 1

Lamination of Films to Foam Blown with $CO_2$ and Pentane

Polystyrene foam sheet of 10 basis (about 100 mils or 2.54 mm) thick was made as described above using a combination of $CO_2$ and pentane as the blowing agent, where 38% by weight of the pentane was replaced with $CO_2$.

Samples of the above films A through F were separately laminated on their EVA surface side to the foam sheet by hand feeding the films into laminating nip rolls set at 208° F. (97° C.) while operating at 20 feet/minute (609.6 cm/minute).

From the barrier foam sheet laminated with A, B, C, D, E, and F, 5000 trays were thermoformed.

Run 2

Lamination of Films to Reclaim Foam Blown with 100% Pentane

The skeleton scrap from barrier foam trays made with barrier films B, C, and D of Run 1 was separately ground and made into three separate groups of pellets of reclaim. These pellets were 27.9% by weight from the flexible barrier film material.

Run 2A

The reclaim from each of these three groups was separately placed in the extruder with virgin polystyrene pellets on a weight percentage of 30% reclaim and 70% polystyrene pellets and made into thermoformed polystyrene foam sheet using only 100% pentane as the blowing agent. This sheet was approximately 6.15% by weight from the flexible barrier film material. The sheet was 10 basis (about 100 mils or 2.54 mm thick).

This sheet of foam (which was 30% by wt reclaim) described in the paragraph above was then laminated with films A, B, C, D, E, and F.

Run 2B

Lamination of Films to Reclaim Foam Blown with $CO_2$ and Pentane

Run 2A was repeated but this time the blowing agent was a combination of $CO_2$ and pentane where 38% by weight of the pentane was replaced with $CO_2$. This sheet was approximately 6.97% by weight from the flexible barrier film material.

The laminated barrier foam sheets from both Run 2A and 2B were thermoformed into 20000 trays.

Run 3

Lamination of Films to Reclaim Foam Blown with $CO_2$ and Pentane

The skeleton scrap from the thermoforming only of the laminates of A and B to foam sheet from Run 2A was mixed and ground together and pelletized into reclaim.

Run 3A

This reclaim was placed in the extruder with virgin polystyrene pellets and made into thermoformed polystyrene foam sheet of 8 basis (about 80 mils or 2.03 mm) using a combination of $CO_2$ and pentane as the blowing agent where 38% by weight of the pentane was replaced with $CO_2$. This was done on a weight percentage of 30% reclaim and 70% polystyrene pellets.

Run 3B

Run 3A was repeated but foam sheet of 10 basis (about 100 mils or 2.54 mm) was made.

Run 3C

Run 3B was repeated but on a weight percentage of 50% reclaim pellets and 50% virgin polystyrene pellets.

For runs 3A and 3B, the sheets were measured as approximately 4.2% by weight from the flexible barrier film material versus a theoretical calculation of 8.2%.

For Run 3C, the sheet was measured as approximately 14.9% by weight from the flexible barrier film material versus a theoretical calculation of 13.8%

The sheets of foam containing 30% reclaim (Runs 3A and 3B) and the sheets of foam containing 50% reclaim (Run 3C) were laminated with barrier films A, B, C, D, E, and F.

The laminated barrier foam sheets from Runs 3A, 3B, and 3C were thermoformed into 6000 trays.

Run 4

The skeleton scrap from the thermoforming of Runs 3A, 3B, and 3C was mixed and ground together and pelletized into reclaim, which was approximately 30.5% by weight of EVOH from the barrier film.

EXAMPLE III

Lamination of Films to Freon Blown Foam

Polystyrene foam sheet about 100 mils (2.54 mm) thick was made as described above, but instead of blowing with $CO_2$ and pentane, sheet was blown with 100% Freon 22. Films A, B, E, & F (all of which had a surface EVA layer with MI=3) were separately laminated to the foam sheet.

EXAMPLE IV

Making of EVOH barrier films is repeated as per Example I, except this time instead of a surface layer of EVA, a surface layer of ethylene methacrylic acid is used, and instead of 4 mils, the films are 2 mils (about 51 microns) thick. Then these barrier films are laminated to PS foam sheet, and the resultant thermoformed into trays, as in Example II. The scrap from the trays is ground and made into pellets and fed into the extruder with virgin PS pellets, and the resultant PS sheet is laminated with more of the barrier film. This laminate is then thermoformed into trays.

EXAMPLE V notebook 200865, SDX 1262

Flexible barrier film A was laminated onto PS foam sheet as in Run 1 of Example II, except the foam had been blown with 100% pentane instead of a combination of pentane and $CO_2$.

This was repeated with flexible barrier film B, and then repeated with flexible barrier film C.

Then the 3 barrier foam sheets were thermoformed into trays.

The trays were evacuated and lidded with a metallic foil film (such materials do not transmit oxygen) using a Mahaffy and Harder HTS-1500 machine.

Then the trays were checked for $O_2$ barrier properties by measuring the oxygen in the head space between the tray and the lid. For each tray, 2 to 5 samples were tested. Some were tested "wet" by having placed a water soaked paper towel in the tray bottom under a nylon block prior to lidding the tray. Additional sets of trays were stored in a closed 39° F. refrigerator for 48 hours, and tested. Additional sets of trays were stored in a closed 39° F. refrigerator for 2 weeks and tested. Results are summarized in the Table below.

TABLE

| | (% $O_2$ in Headspace) | | | | | | | |
|---|---|---|---|---|---|---|---|---|
| | WET SAMPLE | | | DRY SAMPLE # | | | | |
| TRAY TYPE | 1 | 2 | 3 | 1 | 2 | 3 | 4 | 5 |
| Initial $O_2$ testing prior to 39° F. storage: | | | | | | | | |
| PS sheet laminated with film A | 0.023 | 0.022 | 0.021 | 0.019 | 0.018 | 0.018 | NT* | NT |
| PS sheet laminated with film B | 0.020 | 0.021 | 0.025 | 0.020 | 0.020 | 0.019 | NT | NT |
| PS sheet laminated with film C | 0.017 | 0.018 | 0.017 | 0.018 | 0.019 | NT | NT | NT |
| Subsequent $O_2$ testing after 39° F. storage for 48 hours: | | | | | | | | |
| PS sheet laminated with film A | 0.032 | 0.030 | 0.025 | 0.029 | 0.007 | 0.043 | 0.028 | 0.028 |
| PS sheet laminated with film B | 0.031 | 0.025 | 0.021 | 0.026 | 0.010 | 0.028 | 0.029 | 0.030 |
| PS sheet laminated with film C | 0.079 | 0.146 | 0.060 | 0.095 | 0.086 | 0.086 | 0.606 | 0.122 |
| Subsequent $O_2$ testing after storage for 2 weeks: | | | | | | | | |
| PS sheet laminated with film A | 0.024 | 0.027 | 0.022 | 0.038 | 0.057 | 0.057 | NT | NT |
| PS sheet laminated with film B | 1.3 | 0.044 | 0.037 | 0.053 | 0.051 | 0.048 | NT | NT |
| PS sheet laminated with film C | 0.314 | 2.8 | 3.3 | 0.889 | 20.8 | 0.645 | NT | NT |

While certain representative embodiments and details have been shown for the purpose of illustration, numerous modifications to the formulations described above can be made without departing from the invention disclosed.

We claim:

1. A method to recycle thermoformable barrier sheet comprising:
    (a) extruding and foaming polymer pellets thereby making a first sheet of foamed polymer having two opposing surfaces;

(b) laminating onto at least one said surface of said first foamed sheet a flexible barrier film, said flexible barrier film having a barrier layer containing a barrier polymer selected from ethylene vinyl alcohol copolymer, acrylonitrile copolymer, amorphous nylon copolymer, or mixtures thereof, and a bonding layer, whereby the bonding layer is adhered to the one said surface of said foamed polymer sheet thereby making a laminate;

(c) thermoforming the resultant laminate where steps (b) and (c) generate scrap of laminate;

(d) making reclaim pellets by grinding and pelletizing the scrap;

(e) extruding and foaming more of said polymer pellets together with from about 0.001% up to about 100% by weight of the reclaim pellets of scrap, thereby making a second sheet of foamed polymer having two opposing surfaces; and (f) laminating onto at least one said surface of said second foamed sheet a flexible barrier film;

whereby said second foamed sheet contains on a weight basis from about 0.0001% up to about 30% flexible barrier film and wherein said foaming steps comprise injecting 100% carbon dioxide as a blowing agent.

2. A method for making a foamed article with barrier properties, comprising:
providing polymer pellets;
heating said pellets to produce a polymer melt;
injecting a blowing agent into said melt;
extruding said blowing agent-containing melt into a sheet;
laminating a barrier film onto said sheet;
thermoforming the laminated sheet into a plurality of articles;
trimming the excess, non-formed laminated sheet thereby forming scrap;
pelletizing said scrap; and
introducing said scrap into said polymer pellets.

3. The method of claim 2 wherein said blowing agent is 100% carbon dioxide such that said sheet is free of volatile hydrocarbon residue thereby allowing lamination and thermoforming immediately after extrusion.

* * * * *